United States Patent [19]
Merkle et al.

[11] 3,851,673
[45] Dec. 3, 1974

[54] MOUNTING ASSEMBLY FOR EXHAUST PIPE

[75] Inventors: Ralph H. Merkle, Brighton; Malcolm H. Humbert, Pontiac, both of Mich.

[73] Assignee: General Motors Corporation, Detroit, Mich.

[22] Filed: May 21, 1973

[21] Appl. No.: 362,466

[52] U.S. Cl.............. 138/106, 138/107, 138/113, 248/54 R
[51] Int. Cl.............................................. F16l 3/00
[58] Field of Search.................. 138/106, 107, 113; 248/54 R, 56

[56] References Cited
UNITED STATES PATENTS
208,264    9/1878    Peirce.............................. 138/113

FOREIGN PATENTS OR APPLICATIONS
325,039    6/1970    Sweden............................. 248/54

*Primary Examiner*—James J. Gill
*Assistant Examiner*—Anthony V. Ciarlante
*Attorney, Agent, or Firm*—Edward J. Biskup

[57] ABSTRACT

A mounting assembly for resiliently supporting an exhaust pipe on a vehicle frame including a tubular collar that is adapted to encircle a portion of the exhaust pipe and be secured thereto so as to provide an open-ended annular air space between the collar and the exhaust pipe. A ring-shaped grommet of elastomeric material is frictionally supported by the collar and is adapted to be located within a well formed within a retainer bracket which serves to compressively secure the grommet to the frame.

2 Claims, 5 Drawing Figures

PATENTED DEC 3 1974　　　　　　　　　3,851,673

MOUNTING ASSEMBLY FOR EXHAUST PIPE

The present invention concerns an improved mounting assembly for resiliently supporting an exhaust pipe on a vehicle frame so as to minimize transmission of vibration and engine noises to the passenger compartment. More specifically, the invention contemplates a mounting assembly for maintaining an exhaust pipe within a relatively small opening provided in a vehicle frame so that the exhaust pipe can experience radial movement without permitting the pipe to contact the vehicle frame and also move longitudinally due to exhaust pipe temperature changes.

In the preferred form, the mounting assembly made according to the invention includes a collar which encircles a portion of the exhaust pipe adjacent the opening in the vehicle frame and is secured to the outer surface of the pipe so as to provide an open-ended air space around the pipe. A grommet made of elastomeric material is mounted on the collar and has portions thereof compressed into engagement with the frame by a retainer bracket which is secured to the frame. The retainer bracket is characterized by having a well formed therein for accommodating the grommet and an opening of a size larger than the collar. The opening is centrally formed in the well for receiving the exhaust pipe therethrough.

The objects of the present invention are to provide a mounting assembly for supporting an exhaust pipe within a relatively small opening in a vehicle frame so that vibratory movement of the pipe is cushioned by a resilient member; to provide a resilient mounting which allows an exhaust pipe to be located within a vehicle frame opening that is not too much larger than the outer diameter of the exhaust pipe and permits the latter to move laterally and slide longitudinally; and to provide a mounting assembly for an exhaust pipe that includes a collar that encircles a portion of the pipe and provides an annular space through which cooling air can flow so as to prevent heat from being transferred from the exhaust pipe to a supporting grommet of elastomeric material carried by the collar and secured to the vehicle frame.

The above objects and others will be more apparent from the following detailed description when taken with the drawings in which.

Figure 1:
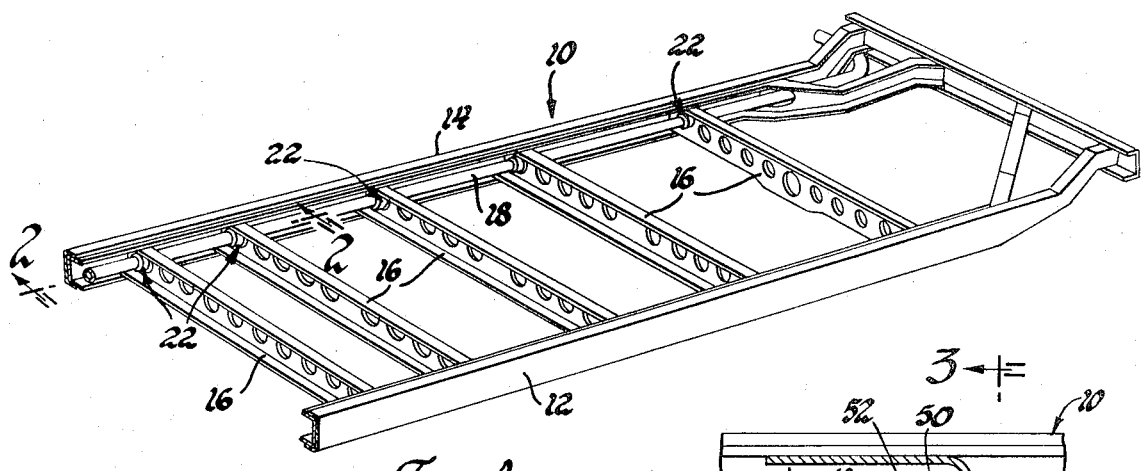
FIG. 1 is a perspective view showing a vehicle frame incorporating an exhaust pipe mounting assembly made according to the invention.

Referring to the drawings and more specifically FIG. 1 thereof, a vehicle frame 10 is shown comprising a pair of laterally spaced parallel side rails 12 and 14 which are interconnected by a plurality of similarly formed transversely extending cross bars 16 each of which is provided with a plurality of circular openings. Although not shown, the vehicle frame 10 has a forward portion which supports a front wheel drive train including an engine and transmission. The exhaust gases from the engine flow into an exhaust system which includes the exhaust pipe 18 shown in FIG. 1 which extends through identically sized axially aligned openings 20 formed in the cross bars 16 and is outwardly curved at its rearward end towards the side of the vehicle frame 10.

Figure 2:
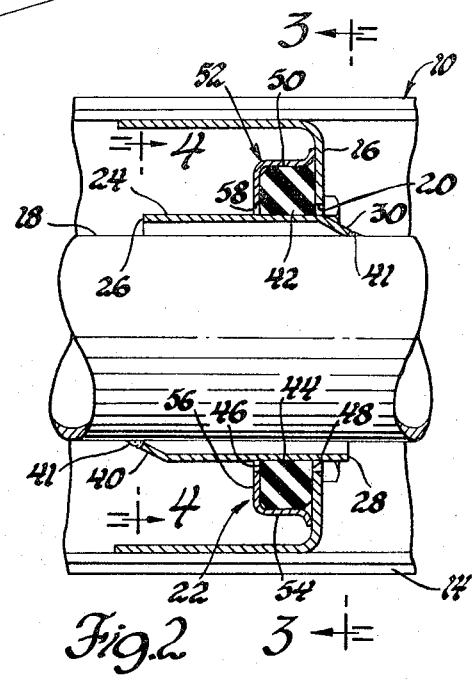
FIG. 2 is an enlarged sectional view taken on lines 2—2 of FIG. 1 showing the exhaust pipe mounting assembly.

As seen in FIG. 2, each opening 20 through which the exhaust pipe extends is small relative to the outer diameter of the exhaust pipe 18. As a result, it should be apparent that vibratory movement of the exhaust pipe 18 could result in the latter contacting the frame and creating objectionable rattles which could be transmitted to the passenger compartment of the vehicle. In order to prevent this from occurring, a mounting assembly 22 is provided as seen in FIGS. 2 through 4 which serves to resiliently support the exhaust pipe 18 within each of the openings 20 and permits the latter to deflect radially a limited amount and also slide longitudinally.

Figure 5:
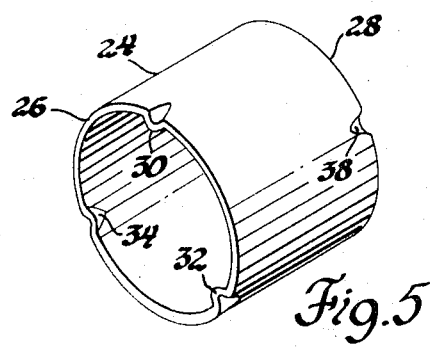
FIG. 5 is an isometric view showing the collar which forms a part of the mounting assembly disclosed in FIGS. 1–4.

In this connection, it will be noted that the mounting assembly 22 includes a tubular collar 24 which, as seen in FIG. 5, takes the form of a right cylinder having the opposite ends 26 and 28 thereof respectively provided with dimples 30, 32, 34 and 36, 38, 40 located at circumferentially and equally spaced points. The inner diameter of the collar 24 is greater than the outer diameter of the exhaust pipe 18 so the collar 24 can be mounted on the exhaust pipe 18 and have an annular air space therebetween. Thus, as seen in FIG. 2, the collar 24 is adapted to be positioned on the exhaust pipe 18 so that a portion of the collar extends within the opening 20 in the cross bar 16 with the dimples 30–40 serving as spacers as well as points where the collar is secured to the outer surface of the exhaust pipe 18 by tack welds 41.

A ring-shaped grommet 42 made of silicone elastomeric compound is frictionally carried by the peripheral surface of the collar 24 and serves as a flexible link for connecting the exhaust pipe 18 to the cross bar 16. The grommet 42 is formed with a circular opening 44 which is of the same diameter as the outer diameter of the collar 24, a pair of parallel side walls 46 and 48 and an outer circular surface 50 which lies in a cylinder that is normal to the side walls 46 and 48.

Figure 3:
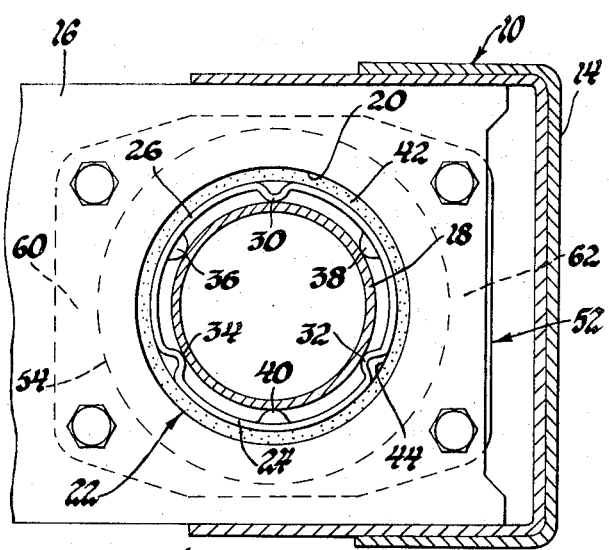
FIG. 3 is an end view of the mounting assembly taken on lines 3—3 of FIG. 2.
Figure 4:
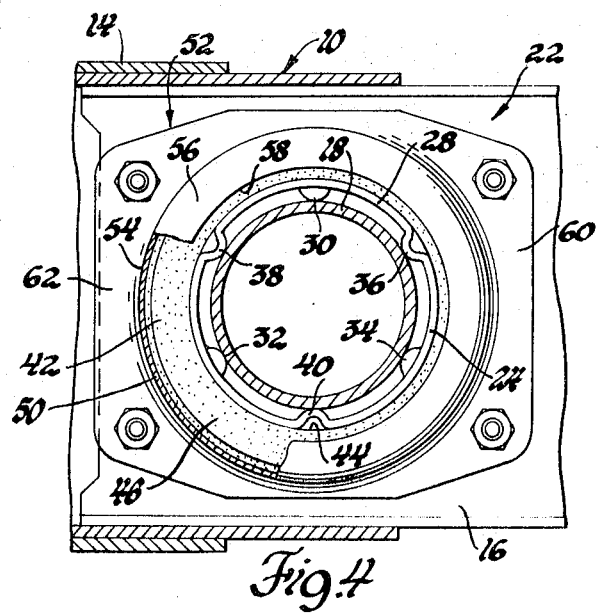
FIG. 4 is a view similar to FIG. 3 but taken on lines 4—4 of FIG. 2.

The grommet 42 is retained in position relative to the cross bar 16 by a retainer bracket 52 which as seen in FIGS. 3 and 4 is generally rectangular in configuration and has a circular well formed therein defined by an annular wall 54 and an end wall 56 as seen in FIGS. 2 and 4. The well is generally of the same configuration as the grommet 42 but is of a depth less than the distance between the side walls 46 and 48 of the grommet. In addition, a circular opening 58 is centrally formed in the well of a diameter which is greater than the outer diameter of the collar. As seen in FIG. 2, the grommet 42 is received within the well and compressed by end wall 56 of the retainer bracket 52 into firm engagement with the cross bar 16. This is done by bolting the laterally extending arms 60 and 62 of the retainer bracket 52 directly to the cross bar 16.

Thus, from the above description, it should be apparent that a mounting assembly is provided which prevents destructive exhaust pipe heat from being transferred to the grommet 42 by permitting cooling air to flow through the air space provided by the collar 24 between the ends 26 and 28 thereof. As a result, the problem of the grommet experiencing a breakdown of its elastomeric material due to heat is substantially eliminated. In addition, the exhaust pipe is so supported by the mounting assembly that it may slide longitudinally and deflect radially and at the same time be cushioned by the grommet so as to prevent engine noises from being transmitted through the frame to the passenger compartment.

Various changes and modifications can be made in this construction without departing from the spirit of the invention. Such changes and modifications are contemplated by the inventors and they do not wish to be limited except by the scope of the appended claims.

We claim:

1. A mounting assembly for resiliently supporting an exhaust pipe within an aperture provided in a vehicle frame, said mounting assembly including a tubular collar having an inner diameter larger than the outer diameter of said exhaust pipe and adapted to encircle a portion of the exhaust pipe within said aperture, said collar having a pair of opposed end portions provided with circumferentially spaced and radially inwardly projecting dimples, means securing said dimples at spaced points to the outer surface of the exhaust pipe so as to provide an annular air space between said outer surface and said collar for air to flow therethrough, a ring-shaped grommet of elastomeric material adapted to be frictionally supported by said collar, a retainer bracket having a well formed therein corresponding in configuration to said grommet, a circular opening centrally formed in said well having a diameter greater than the outer diameter of said collar, said retainer bracket adapted to receive the grommet in said well and compressively secure a portion of said grommet to said frame so as to allow said exhaust pipe to be resiliently supported for longitudinal and radial movement relative to said frame.

2. A mounting assembly for resiliently supporting an exhaust pipe within an aperture provided in a vehicle frame, said mounting assembly including a collar having a pair of opposed end portions and an opening extending therethrough of a size larger than the outer diameter of said exhaust pipe and adapted to encircle a portion of the exhaust pipe that is located within said aperture, means securing said opposed end portions of said collar to the outer surface of said exhaust pipe so as to circumferentially space said collar from said exhaust pipe and provide an air chamber that surrounds the exhaust pipe for cooling air to flow into said air chamber at one end portion of said collar and out of said air chamber at the other end portion, a resilient grommet having a predetermined width and adapted to be frictionally supported by said collar, a retainer bracket having a pair of laterally extending arm portions for fastening said bracket to said vehicle frame, a well formed in said bracket corresponding in configuration to said grommet, said well having a depth dimension that is less than the dimension of said predetermined width, an opening centrally formed in said well of a size larger than the outer size of said collar, said retainer bracket adapted to receive the grommet in said well and compressively secure portions of said grommet to said frame so as to allow said exhaust pipe to be resiliently supported for longitudinal and radial movement relative to said frame when said arm portions are fastened to said frame.

* * * * *